United States Patent
Ortega Andrade et al.

(10) Patent No.: US 10,557,079 B2
(45) Date of Patent: Feb. 11, 2020

(54) METHOD OF MAKING ROD-SHAPED PARTICLES FOR USE AS PROPPANT AND ANTI-FLOWBACK ADDITIVE

(71) Applicant: Schlumberger Technology Corporation, Sugar Land, TX (US)

(72) Inventors: Jose Alberto Ortega Andrade, Houston, TX (US); Jiangshui Huang, Sugar Land, TX (US); Bernhard R. Lungwitz, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 401 days.

(21) Appl. No.: 15/217,078

(22) Filed: Jul. 22, 2016

(65) Prior Publication Data
US 2018/0022987 A1 Jan. 25, 2018

(51) Int. Cl.
*C09K 8/80* (2006.01)
*C09K 8/92* (2006.01)

(52) U.S. Cl.
CPC . *C09K 8/80* (2013.01); *C09K 8/92* (2013.01)

(58) Field of Classification Search
None
See application file for complete search history.

(56) References Cited

U.S. PATENT DOCUMENTS

| | | | |
|---|---|---|---|
| 4,060,497 A | 11/1977 | Huschka et al. | |
| 5,500,162 A | 3/1996 | Theisen et al. | |
| 6,197,073 B1 | 3/2001 | Kadner et al. | |
| 7,849,923 B2 | 12/2010 | Burukhin et al. | |
| 7,931,966 B2 | 4/2011 | Burukhin et al. | |
| 8,529,237 B2 | 9/2013 | Ikeda et al. | |
| 8,562,900 B2 | 10/2013 | Alary et al. | |
| 8,657,002 B2 | 2/2014 | Willberg et al. | |
| 8,883,693 B2 | 11/2014 | Eldred et al. | |
| 2005/0082062 A1 | 4/2005 | Webber et al. | |
| 2006/0016598 A1 | 1/2006 | Urbanek | |
| 2008/0234146 A1 | 9/2008 | Barmatov et al. | |
| 2010/0087341 A1* | 4/2010 | Alary | C04B 35/111 507/271 |
| 2011/0180259 A1 | 7/2011 | Willberg et al. | |
| 2011/0233314 A1 | 9/2011 | Hart et al. | |
| 2012/0227968 A1 | 9/2012 | Eldred et al. | |
| 2012/0247764 A1 | 10/2012 | Panga et al. | |

(Continued)

OTHER PUBLICATIONS

Edelman et al., "Rod-shaped Proppant Provides Superior Proppant Flowback Control in the Egyptian Eastern Desert", SPE 164014, SPE Middle East Unconventioanl Gas Conference and Exhibition, Jan. 28-30, 2013, 7 pages.

(Continued)

*Primary Examiner* — Jeffrey D Washville
(74) *Attorney, Agent, or Firm* — Andrea E. Tran

(57) ABSTRACT

A method for forming rod-shaped particles includes reducing a length of rods derived from a slurry made up of particles and a reactant, wherein the rods are in a stabilized state in which the reactant has been at least partially reacted with a coagulant, but the rods have not been sintered, and subsequently sintering the reduced length stabilized rods. The reducing the length of the stabilized rods includes subjecting the stabilized rods to mechanical vibration applied by a device, or feeding the stabilized rods through a device having a rotating cutting mechanism.

12 Claims, 2 Drawing Sheets

(56) References Cited

U.S. PATENT DOCUMENTS

2013/0025862 A1* 1/2013 Eldred .................... C09K 8/80
166/280.2
2014/0145298 A1 5/2014 Li et al.
2015/0307773 A1 10/2015 Hulseman et al.

OTHER PUBLICATIONS

International Search Report and Written Opinion issued in International Patent Appl. No. PCT/US2017/041429 dated Oct. 16, 2017; 15 pages.
Liu et al., "A New Generation High-Drag Proppant: Prototype Development, Laboratory Testing, and Hydraulic Fracturing Modeling", SPE-173338, Society of Petroleum Engineers, SPE Hydraulic Fracturing Technology Conference, The Woodlands, Texas, USA, Feb. 3-5, 2015.
International Preliminary Report on Patentability issued in International Patent Appl. No. PCT/US2017/041429 dated Jan. 31, 2019; 11 pages.

* cited by examiner

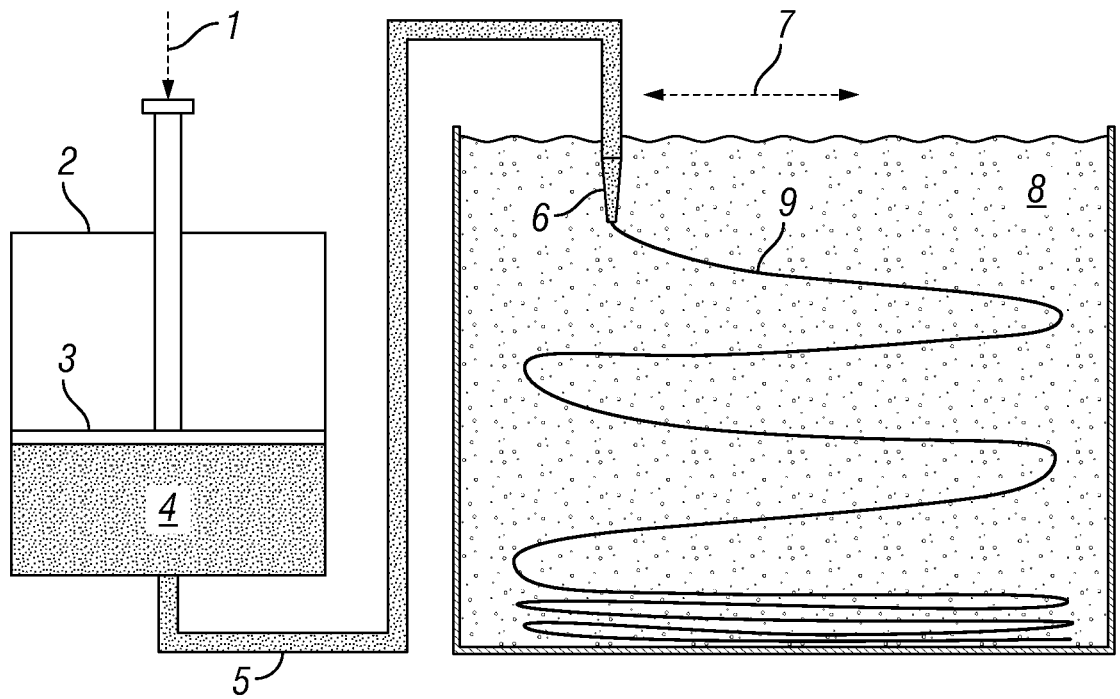
FIG. 1
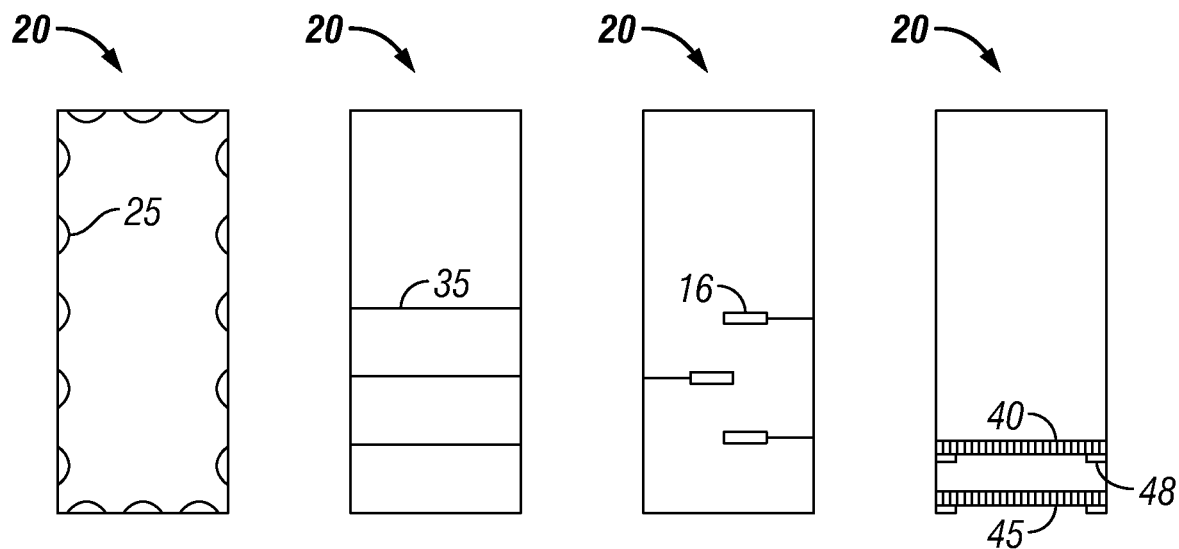
FIG. 2  FIG. 3  FIG. 4  FIG. 5

METHOD OF MAKING ROD-SHAPED PARTICLES FOR USE AS PROPPANT AND ANTI-FLOWBACK ADDITIVE

BACKGROUND

Hydrocarbons (such as oil, condensate, and gas) may be produced from wells that are drilled into formations containing them. For a variety of reasons, such as low permeability of the reservoirs or damage to the formation caused by drilling and completion of the well, or other reasons resulting in low conductivity of the hydrocarbons to the well, the flow of hydrocarbons into the well may be undesirably low. In this case, the well is "stimulated," for example, using hydraulic fracturing, chemical (such as an acid) stimulation, or a combination of the two (often referred to as acid fracturing or fracture acidizing).

Hydraulic and acid fracturing treatments may include two stages. A first stage comprises pumping a viscous fluid, called a pad, that is typically free of proppants, into the formation at a rate and pressure high enough to break down the formation to create fracture(s) therein. In a subsequent second stage, a proppant-laden slurry is pumped into the formation in order to transport proppant into the fracture(s) created in the first stage. In "acid" fracturing, the second stage fluid may contain an acid or other chemical, such as a chelating agent, that can assist in dissolving part of the rock, causing irregular etching of the fracture face and removal of some of the mineral matter, which results in the fracture not completely closing when the pumping is stopped. Occasionally, hydraulic fracturing may be done without a highly viscosified fluid (such as water) to minimize the damage caused by polymers or the cost of other viscosifiers. After finishing pumping, the fracture closes onto the proppant, which keeps the fracture open for the formation fluid (e.g., hydrocarbons) to flow to the wellbore of the well.

Proppant is typically made of materials such as sand, glass beads, ceramic beads, or other materials. Sand is used frequently as the proppant for fracture treatments. However, for fractures with high closure stress, such as greater than 6,000 pound per square inch (psi), in deep wells or wells with high formation forces, higher strength proppant is desired. The closure stress that sand can sustain is normally about 6,000 psi, so a closure stress over 6,000 psi could crush the sand into fine particles and collapse the sand pack, which results in insufficient conductivity for the formation fluid to flow to the wellbore. Furthermore, the fine particles may continually flow back during production of the well, and thus the conductivity of the well would reduce further, which results in a short useful life of the well or results in a need for costly refracturing of the well.

Ceramic proppant has been used to maintain the conductivity of the wells with a high closure stress. Typically, the higher the alumina ($Al_2O_3$) content, the higher the hardness and toughness of the ceramic proppant, but also the higher the specific gravity. A high specific gravity may lead to quick gravitational settling of the proppant, which results in difficulty to transport the proppant into the fracture, especially for locations far from the wellbore. Also, quick settling in the fracture leads to lack of proppant on the top part of a fracture, which reduces the productivity of the well. To transport proppant of high specific gravity with fracturing fluid of a low viscosity, fiber can be added to the fluid as an additive. See, for example, U.S. Pat. No. 8,657,002, incorporated herein by reference in its entirety. To use fiber effectively for transporting proppant, the interaction force between fiber and proppant is important.

Other proppant shapes have been proposed for hydraulic fracturing applications such as plate-like proppant (U.S. Patent Application Publication No. 2011/0180259) and rod-shaped proppant (U.S. Pat. No. 8,562,900). The rod-shaped proppant described in U.S. Pat. No. 8,562,900 is made by extruding a mixture containing alumina-containing materials, a binding agent, a solvent, and other additives such as lubricants and plasticizers through a die. The mixture is not flowable and thus after extruding, the rod shape is maintained. After drying or after sintering, the extruded rod is cut into desired length suitable to use as proppant.

The so-called drip-casting manufacturing technique has been adapted for the manufacture of spherical ceramic proppants. Drip-casting substitutes conventional ways of pelletizing (also called granulating) ceramic proppant such as using high intensity mixers and pan granulators. Vibration-induced dripping (or drip-casting) was first developed to produce nuclear fuel pellets. See U.S. Pat. No. 4,060,497. It has subsequently evolved into applications for metal and ceramic microspheres for grinding media, pharmaceuticals and food industry. An application of vibration-induced dripping to aluminum oxide spheres is described in U.S. Pat. No. 5,500,162. The production of the microspheres is achieved through vibration-provoked dripping of a chemical solution through a nozzle. The falling drops are surrounded by a reaction gas, which causes the droplet to gel prior to entering the reaction liquid (to further gel). Using a similar approach, U.S. Pat. No. 6,197,073 covers the production of aluminum oxide beads by flowing a sol or suspension of aluminum oxide through a vibrating nozzle plate to form droplets that are pre-solidified with gaseous ammonia before their drop into ammonia solution. U.S. Patent Application Publication No. 2006/0016598 describes the drip-casting to manufacture a high-strength, light-weight ceramic proppant. U.S. Pat. No. 8,883,693 describes the application of the drip-casting process to make ceramic proppant.

Co-pending U.S. patent application Ser. No. 14/946,085, filed Nov. 19, 2015, incorporated herein by reference in its entirety, describes a method for forming rod-shaped particles comprising inducing flow of a slurry comprised of particles and a reactant through one or more orifices and into a coagulation solution, wherein the slurry exiting the one or more orifices is a continuous uninterrupted stream; coagulating the reactant in the coagulation solution to form stabilized rods; drying the stabilized rods; and reducing a length of the dried stabilized rods. The rod-shaped particles after sintering may be used for applications such as downhole application, for example including as proppants and as anti-flowback additives.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

What is still desired is a convenient and cost effective method of forming rod-shaped particles able to perform well in downhole applications in fracture formation, for example as a proppant and/or as an anti-flowback additive.

Described herein is a method for forming rod-shaped particles comprising reducing a length of rods derived from a slurry comprised of particles and a reactant, wherein the rods are in a stabilized state in which the reactant has been at least partially reacted with a coagulant, but the rods have not been sintered; and subsequently sintering the reduced length stabilized rods.

Also described is a method for forming rod-shaped particles comprising inducing flow of a slurry comprised of particles and a reactant through one or more orifices and into a coagulation solution, wherein the slurry exiting the one or more orifices is a continuous uninterrupted stream until rods of a desired length are formed, at least partially coagulating the reactant of the rods in the coagulation solution to form stabilized rods, reducing a length of the stabilized rods by subjecting the stabilized rods to mechanical vibration applied by a device or by feeding the stabilized rods through a device having a rotating cutting mechanism, and subsequently sintering the reduced length stabilized rods.

BRIEF DESCRIPTION OF THE DRAWINGS

FIG. 1 is a schematic of an example apparatus for forming continuous rods.

FIGS. 2-5 illustrate example devices for applying mechanical vibration to stabilized rods to reduce the length thereof.

DETAILED DESCRIPTION

Figure 6:
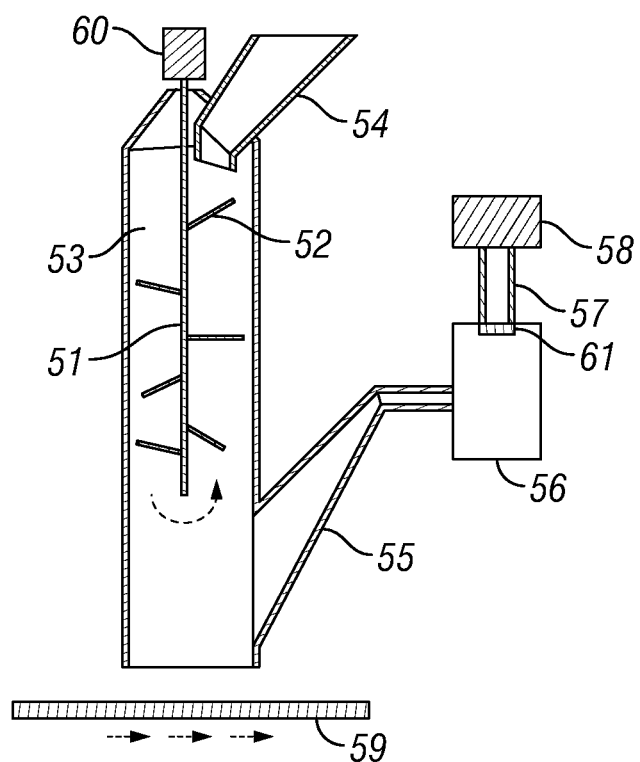
FIG. 6 illustrates an example device for cutting stabilized rods.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The present disclosure relates to methods of making rod-shaped particles, to the rod-shaped particles made by such methods, and to treatment fluids that contain the rod-shaped particles made by such methods, wherein the rod-shaped particles may function as, for example, proppants and/or anti-flowback additives.

While in embodiments the rod-shaped particles herein are used in the context of a treatment fluid, for example as a proppant material and/or anti-flowback additive, it is not intended that the rod-shaped particles as described herein be limited to being proppants and/or anti-flowback additives in such treatment fluids.

As used herein, the term "treatment fluid" refers to any pumpable and/or flowable fluid used in a subterranean operation in conjunction with a desired function and/or for a desired purpose. In some embodiments, the pumpable and/or flowable treatment fluid may have any suitable viscosity, such as a viscosity of from about 1 cP to about 10,000 cP, such as from about 10 cP to about 1000 cP, or from about 10 cP to about 100 cP, at the treating temperature, which may range from a surface temperature to a bottom-hole static (reservoir) temperature, such as from about 0° C. to about 200° C., or from about 10° C. to about 120° C., or from about 25° C. to about 100° C., and a shear rate (for the definition of shear rate reference is made to, for example, Introduction to Rheology, Barnes, H.; Hutton, J. F; Walters, K. Elsevier, 1989, the disclosure of which is herein incorporated by reference in its entirety) in a range of from about 1 $s^{-1}$ to about 1000 $s^{-1}$, such as a shear rate in a range of from about 100 $s^{-1}$ to about 1000 $s^{-1}$, or a shear rate in a range of from about 50 $s^{-1}$ to about 500 $s^{-1}$ as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety.

As used herein, the term "rod-shaped particle" or "rod-shaped particles" refers to a particle(s) having a geometrically shaped cross-section and dimensions in which a length of the particle(s) is greater than a cross-sectional width of the particle(s). In embodiments, the cross-sectional geometric shape is substantially circular, and the rod-shaped particle has a length that is greater than the cross-sectional diameter of the particle. The average length to width/diameter ratio may be at least 2:1. The rod-shaped particles are not limited to having a cross-sectional geometric shape of circular, and other cross-sectional shapes may be used, such as triangular or rectangular. Further, the rod-shaped particle may be substantially straight over the length of the particle, or the particle may have a degree of curvature over the length of the particle.

As will be described herein, the rod-shaped particles are derived from rods that are reduced in length. "Rods" as used herein refers to rods that may be formed by inducing flow of a slurry comprised of particles and a reactant through one or more orifices and into a coagulation solution, wherein the slurry exiting the one or more orifices is a continuous uninterrupted stream. "Continuous uninterrupted stream" in this regard refers to an unbroken stream of desired length of the slurry in rod form. The slurry flow through the one or more orifices may be continued until rods of a desired length are obtained. There is no limitation on the length of the continuous rods as initially formed.

The method of forming the rods is first described. In embodiments, the rods are formed by inducing flow of a slurry comprised of particles and a reactant through one or more orifices and into a coagulation solution, wherein the slurry exiting the one or more orifices is a continuous uninterrupted stream until rods of a desired length are formed, and at least partially coagulating the reactant of the rods in the coagulation solution to form stabilized rods.

In embodiments, the method further comprises forming the slurry of particles and reactant by mixing. As the particles, the particles may be made of any suitable material, such as, for example, ceramic materials, sand, non-ceramic materials, composites of ceramic reinforced with additional stronger materials and the like. As the ceramic particles of the slurry, any suitable ceramic material may be used, for example glass, and ceramic oxides such as alumina, bauxite, aluminum hydroxide, pseudo boehmite, kaolin, kaolinite, silica, silicates, clay, talc, magnesia and mullite. The ceramic particles may include alumina-containing particles or magnesium-containing particles. The ceramic particles may also be a composite particle that is comprised of ceramic reinforced with higher strength materials, which may be ceramic or non-ceramic, for example such as titanium carbide, carbon nanotubes or reinforcement elements such as fibers or polymers. Where the rod-shaped particles may be used as a proppant that may need to withstand a higher fracture closure stress, for example of 6,000 psi or more, alumina-containing particles are desired because rod-shaped particles derived from alumina-containing particles have a higher strength and toughness. Typically, the higher the alumina ($Al_2O_3$) content, the higher the strength, hardness and toughness of the rod-shaped particles. In embodiments, the ceramic particles may have an alumina content of from, for example, 5% to 95% by weight alumina, such as 20% to 75% by weight or 30% to 75% by weight.

While the particles may have any suitable size, an average size of less than 500 microns, such as an average size of 0.01 to 100 microns or 0.01 to 50 microns, may be desirable. The particles (i.e., the raw material for the rod-shaped particles) are desirably sized depending on the orifice diameter through which the slurry will pass in forming the rod-shaped particles, and the orifice diameter may be equal to or greater than, for example, ten times the raw material particle average diameter.

The reactant in the slurry may be any material that can be coagulated, gelled and/or cross-linked by another material that is present in the coagulation solution. Reactants are typically organic materials used to stabilize the shape of the slurry once it is formed into the desired rod shape. The reactants thus react to form a solid or semi-solid shaped product once exposed to the coagulation solution. Examples of suitable reactants include, for example, polyvinyl alcohol, polyvinyl acetate, methylcellulose, dextrin, polysaccharides such as alginates, for example sodium alginate, and molasses. Sodium alginate is a naturally occurring polysaccharide that is soluble in water as the sodium salt, and is a suitable reactant in the methods described herein. The reactant may be included in the slurry in an amount of from 0.01% to 25%, such as 0.01% to 5% or 0.01% to 1% by weight of the slurry. The solids content of the slurry may be from, for example, 10% to 95%, such as 15% to 90% or 20% to 90%. The solids content may be adjusted so that the slurry has a suitable viscosity for flow through the one or more orifices, such as a viscosity of 1 to 10,000 cP measured at a shear rate of 100 (1/s).

The slurry may also contain one or more solvents. Possible solvents that can be used include water, alcohols, and ketones. Other additives may also be included in the slurry, such as lubricants and dispersants. Lubricants may include one or more of Manhattan fish oil, wax emulsions, ammonium stearates, and wax. Dispersants may include one or more of a colloid, polyelectrolyte, tetra sodium pyrophosphate, tetra potassium pyrophosphate, polyphosphate, ammonium citrate, ferric ammonium citrate, hexametaphosphate, sodium silicate, ammonium polyacrylate, sodium polymethacrylate, sodium citrate, sodium polysulfonate or hexametaphosphate salt, as well as any surfactant.

The slurry may be housed in a container that is associated with the one or more orifices. The slurry is induced to flow from the container to the one or more orifices by any suitable method. For example, the slurry may be induced to flow from the container by applying a load to a piston in the container housing the slurry to force the slurry out an exit port of the container that is associated with the one or more orifices. Also, increasing pressure in the container housing the slurry by any suitable method, and/or decreasing a volume of the container housing the slurry by any suitable method, to force the slurry to exit the container at a port associated with the one or more orifices may also be used. The slurry may also be pumped from the container housing the slurry to the one or more orifices associated with an exit of the container.

The exit port of the container may be connected to a pipe through which the slurry flows to the one or more orifices. Alternatively, the exit port may directly feed the slurry to the one or more orifices.

The one or more orifices may be comprised of a single orifice for making a single, continuous rod form or may be comprised of multiple orifices that each makes a single, continuous rod form. Each orifice may be in the form of, for example, an opening in a membrane. Alternatively, the one or more orifices may be in the form of a spinneret such as used in fiber spinning (see, for example, U.S. Pat. No. 8,529,237, incorporated herein by reference). Each orifice has a size that will substantially correspond to the cross-sectional size, such as cross-sectional diameter or width, of the end rod-shaped particles. For rods with a circular shape cross-section, for example, the diameter can be controlled by the size of the orifice, the jetting rate of the slurry, the moving speed of the orifices, and the rheological properties of the slurry.

The one or more orifices can be used to impart a cross-sectional shape to the rod-shaped particles. For example, the one or more orifices may have a shape such as circle, ellipse, oval, multifoil, triangle, rectangle and the like. As the slurry is flowed through the orifice, the shape of the orifice will be imparted to the slurry such that the rods will have a corresponding cross-sectional shape. In this manner, the rod-shaped particles can be made to have a cross-sectional shape such as circle, ellipse, oval, multifoil, triangle, rectangle and the like.

In addition, a vibration may be applied to the orifices as the slurry flows through the orifices in order to impart an inhomogeneous cross-section along the length of the formed rods. For example, vibrating the orifices by a mechanical means during flowing of the slurry, where the vibration frequency is maintained to a low enough frequency to avoid completely severing the flow, that is, without breaking the continuous flow into separate segments, can alter the cross-section of the rods along the length of the rod. As an example, the vibration can be intermittently applied to thin or thicken (make smaller or bigger) the cross-sectional diameter at points along the length of the continuous rod. When the orifice moves in the same direction of the slurry flow, the cross-section will become thicker, and when the orifice moves in the opposite direction of the slurry flow, the cross-section will become thinner. A suitable range of frequencies for the vibration to thin or thicken the cross-section is, for example, 0.01-100 Hz, as long as the slurry flow is not severed. In addition to the frequency, the vibration amplitude, slurry composition, flow speed and orifice size may also be taken into consideration in determining the frequency of the vibration to be applied.

The orifices may be located above the coagulation solution, or may be immersed in the coagulation solution. The orifices may be fixed in a single position during flowing of the slurry therethrough, or, in embodiments, the orifices may be made to move in a vertical direction with respect to the surface of the coagulation solution. In this manner, the orifices may be made to move in and out of the coagulation solution during the flowing of the slurry therethrough. In still further embodiments, the orifices may be made to move in a horizontal manner, or laterally, with respect to a surface of the coagulation solution while the slurry is flowing therethrough. This may allow for the continuous uninterrupted rods to be organized, or aligned, within the coagulation solution. For example, if the orifices are moved in a circular pattern while the slurry is fed therethrough, the rods may be stacked in a circular pattern within the coagulation solution. This may also be used to impart controlled curvature to the rods, and thus ultimately to the rod-shaped particles. As a further example, moving the orifices back and forth in a horizontal manner can stack the rods in such a way that the individual stacks of rods can be readily gathered for subsequent processing.

To achieve rods of a desired length before size reduction, a periodic spike vibration may be applied to the one or more orifices when an amount of slurry that has passed through the one or more orifices is such that the slurry having exited through the one or more orifices has a predetermined length. Whereas above a low vibration frequency was possibly applied to thin but not sever the continuous flow, here the periodic spike vibration is sufficient to sever the continuous flow at the orifices.

The coagulation solution comprises a coagulant that interacts with the reactant in the slurry to at least partially coagulate, gel and/or cross-link the reactant, thereby forming the slurry into a solid or semi-solid product, referred to herein as a "stabilized rod." Thus, when the slurry comes into contact with the coagulation liquid, the coagulation liquid interacts with the reactant in the slurry to stabilize the shape imparted to the slurry by passing through the orifices. The slurry described herein is rather flowable, and the rod shape is stabilized by chemical reaction at least on the surface of the shaped slurry. Some examples of useful coagulation liquids, for example for use with sodium alginate as a reactant, include, but are not limited to, a calcium salt such as calcium chloride solution at suitable concentration of calcium chloride, or an aluminum chloride hexahydrate solution. The amount of coagulant to include in the solution should desirably be sufficient at a minimum to coagulate, gel and/or cross-link the reactant and at a maximum should desirably not exceed the concentration that will dissolve into the solution. For example, a suitable concentration of the coagulant in the coagulation solution may be, for example, 0.1% to 25%, such as 0.1% to 10% by weight of the coagulation solution.

The slurry may be flowed through the orifices at such a rate that the slurry is maintained in the continuous uninterrupted state as it exits the orifices. If the orifices are located above the coagulation solution, the flowing rate of the slurry may be over a value for the jetting stream of slurry to not only maintain the continuous uninterrupted state but also to penetrate the solution surface and jet into the solution. The value depends not only on the viscosity and density of the slurry but also on the size of the orifice, the distance of the orifice to the coagulation solution, the capillary force and the density of the coagulation solution. A typical value of flowing speed in this arrangement of the orifices may be 1.5 m/s for an alumina slurry made up of 75% by weight of solids, a coagulating solution at a concentration level of 2% by weight, and an orifice size of 0.8 mm in diameter, and a height of 5 mm. If the orifices are located in the coagulation solution, the flowing rate of the slurry suitable for manufacturing the rod-shaped proppant can be, for example, from 0.01 m/s to 5 m/s for an orifice of 0.37 mm in diameter and a slurry composition as in the example discussed immediately above.

As discussed above, the shaped slurry exiting the orifices is in a form of a continuous uninterrupted stream, and is flowed such that it either exits the orifices directly into the coagulation solution in which the orifices are immersed, or is made to penetrate into the coagulation solution when the orifices are located above the coagulation solution, thereby at least partially coagulating the reactant in order to form stabilized rods. The stabilized rods have a quasi-rigid form with sufficient stiffness to be handled without losing their shape.

FIG. 1 is a schematic of one apparatus that may be used for carrying out the above-described method. In FIG. 1, the slurry (4) housed in container (2) is forced to flow by applying a load (1) on a piston (3). When the load is applied to the slurry, the slurry is made to flow out an exit port at the bottom of the container and into tube or pipe (5) that is connected with an orifice (6). In this case, the orifice is immersed in the coagulation solution (8). The slurry exits the orifice as a continuous uninterrupted rod (9). Also shown in FIG. 1 is the option for the orifice to be moved from side to side in a horizontal direction (7) with respect to the surface of the coagulation solution, thereby stacking the continuous rod (9) in an organized manner within the coagulation solution.

The stabilized rods are collected from the coagulation solution by any suitable methodology. The collected stabilized rods may optionally be dried using any suitable drying processes. For example, the stabilized rods may be subjected to air drying, or to drying using electric or gas driers.

After any optional drying step, but before any final step to increase the strength of the end rod-like particles such as sintering, the rods are subjected to a step of reducing a length of the stabilized rods. In this regard, the pre-sintered, stabilized rods may be subjected to mechanical vibration applied by a device or may be fed through a device having a rotating cutting mechanism.

As mentioned above, the stabilized rods possess enough stiffness to keep a quasi-rigid form. This stability of the pre-sintered stabilized rods opens the opportunity for novel methods to break the rods into the end rod-shaped particles of desired length. Once the stiff, rod-like particles have been severed to desired length distributions, the rod-shaped particles may be sintered, or subjected to some alternative suitable strength increasing process, to achieve higher strengths so that the rod-shaped particles are suitable for use in downhole applications, for example as proppants or anti-flowback additives.

A first method of reducing a length of the stabilized rods is by subjecting the stabilized rods to mechanical vibration applied by a device. The device may be, for example, a vessel of any suitable size, and the stabilized rods are loaded into the vessel and vibrational energy is applied to the loaded vessel. Vessels may have a height of from 1 cm to 5 m, and a volume of from about 1 cm$^3$ to about 5 m$^3$. The interior of the vessel may be made of any suitable hard or rough material, such as, for example, glass, ceramics, polymers or metals. The stabilized rods may be loaded to fill any volume of the vessel, for example the stabilized rods may be loaded to occupy from about 5% to about 95%, such as form about 5% to about 75%, by volume of the vessel.

In embodiments, the vessel is a closed vessel, which can assist in reducing the introduction of debris or dust from the mechanical vibration into the atmosphere. The vessel is not limited to being closed, however, and may also be open. The applying of the mechanical energy can be done on a batch basis, with the mechanical energy being applied to a single load of rods until rod-shaped particles of a desired length are obtained, or the applying of the mechanical energy may be done on a continuous basis, with additional rods being introduced continuously or at least at regular intervals, with rod-shaped particles being removed from the vessel as the particles reach a desired size. This removal may be accomplished through the use of sieves located within the vessel, as will be further explained below.

FIGS. 2-5 illustrate various embodiments of possible vessels for use herein. The interior walls of the vessel may be flat and relatively smooth, or as in the vessel of FIG. 2, the vessel 20 may include a plurality of protuberances 25 along one or more interior walls of the vessel. The protuberances may take any suitable form and occur on the interior walls in any frequency, the protuberances enhancing the breaking efficiency of the vessel.

As shown in FIGS. 3 and 4, the vessel 20 may also include structures within the interior space of the vessel to increase the breaking efficiency. The vessel 20 of FIG. 3 includes bars 35 extending from at least one interior wall of the vessel and extending fully across an interior of the vessel. Although a plurality of bars is shown in FIG. 3, one bar may be used if desired. In FIG. 4, the bars extend only partially across the interior space of the vessel. In this embodiment, the bars may have end pads 36 at the distal ends of the bars in the interior space, the pads increasing the surface area of the bars to further increase the efficiency of the size reduction process. The bars and pads may be comprised of materials such as glass, ceramics, polymers and/or metals.

One or more sieves may be included in the vessel, for example at a base portion of the vessel as shown in FIG. 5 with sieves 40 and 45. The sieves may be mounted in the vessel by any suitable means, for example through the use of peripheral rims or slots. The sieves are used to separate out the rods with desired length during the application of vibrational energy to the vessel. As an example shown in FIG. 5, two sieves 40 and 45 are added to vessel 20, with peripheral rims 48 used to support the sieves, and also enabling ease of installation and replacement of the sieves. By choosing the sieve mesh based on the diameter of the rods and by controlling the distance and alignment between the sieves, only rod-shaped particles with a length less than a certain value can pass through the lower sieve and be separated from the vessel. The rod-shaped particles are thus able to exit the vessel when able to pass through a sieve having the smallest size opening, which can be set to be the same as the desired end size of the rod-shaped particles.

The features of the vessels shown in FIGS. 2-5 may be combined in any suitable combination in a single vessel. For example, a vessel may include protuberances and rods, protuberances and sieves, or protuberances, rods and sieves.

The mechanical energy may be applied to the vessel by any suitable means, for example through the mounting of the vessel on a vibration system that has a controllable vibration amplitude and frequency. The amplitude of the applied mechanical vibrational energy may be from, for example, 0.01 mm to 10 cm and the frequency may be from, for example, 10 Hz to 10,000 Hz, although values outside of these ranges may also be suitably used.

Through the application of the mechanical vibration, the pre-sintered stabilized rods hit each other and the interior walls of the vessel, and thus break into shorter lengths.

To further enhance the breaking efficiency, breaking media may be added to the vessel if desired. The media may be made of any kind of solid materials such as glass, natural/sintered ceramic, metals such as steel, and polymers. Also, the media may have any kind of shape, such as particle, rod or ring. The average size of the media may be from, for example, 1 mm to 1 m.

Advantages of reducing the size of the pre-sintered stabilized rods through the application of mechanical vibration include that all the rods placed in the vessel are subjected to the shaking or vibrational energy and can break into short length at the same time. Further, longer rods are easier to break than shorter rods due to applied bending forces, so with more shaking time, the range of the length distribution decreases and the average size is reduced. The vibrational energy amplitude and frequency may be selected in the process to achieve a desired length distribution.

Figure 7:
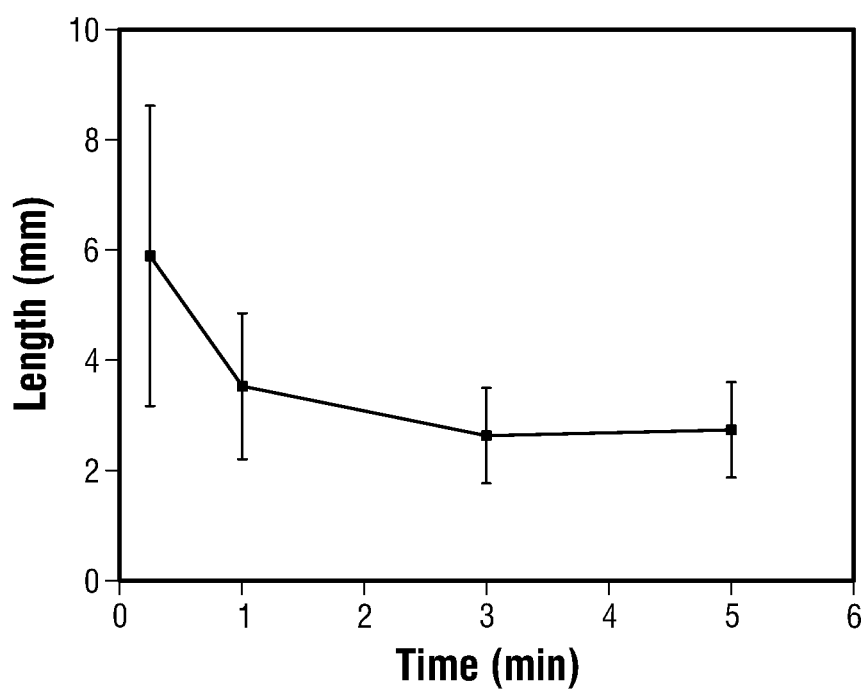
FIG. 7 is a graph illustrating an example of size reduction as a function of time with the application of a mechanical vibration to the stabilized rods.

The stabilized rods may be subjected to the mechanical vibration for any suitable amount of time in order to achieve rod-shaped particles of the desired size. An example range for a period of applying vibrational energy to the vessel may be from 0.1 minutes to 30 minutes, such as 0.1 minutes to 10 minutes. It has been found that the size of the rod-shaped particles typically levels off (reaches a plateau state) at some point, and further size reduction at a given vibrational energy does not occur. For example, FIG. 7 illustrates the average length of the rods as a function of time subjected to vibrational energy, and shows a plateauing of average length over time. If further size reduction is desired where plateauing has occurred, the vibrational energy applied can be increased, or breaking media may be introduced, to affect further size reduction.

A second method of reducing a length of the stabilized rods is by feeding the stabilized rods through a device having a rotating cutting mechanism. A suitable device would have a design in which the stabilized rods are dropped vertically through the device and encounter the rotating cutting mechanism as the stabilized rods fall through the device. As the rotating cutting mechanism within the device, any suitable rotating cutting mechanism may be used, such as a cutting mechanism having one or more bars, with or without pads at a distal end thereof, extending from a rotating spine. The spine may be made to rotate by being attached to, for example, a driving motor, which can be operated at any desirable rate of rotation, for example from 1 rpm to 10,000 rpm or more, and can be rotated either clockwise or counterclockwise.

An example device having a rotating cutting mechanism is illustrated in FIG. 6. In the FIG. 6 device, spine 51 is attached to motor 60, and a plurality of bars 52 extend from the spine and across the cutting chamber 53 of the device. The spine and bars are made to rotate by the motor. The stabilized rods to be cut are fed through the feeding funnel 54 and into the cutting chamber 53. After being fed into the chamber, the stabilized rods contact the rotating bars 52 as they fall through the cutting chamber, and the length of the stabilized rods is thereby reduced. The number of the cutting bars is not limited, and may be varied between 1 to 100 or more. Also, the bars can be of any shape, length and diameter, including different shapes, lengths and diameters among different bars, distributed in any direction, and made of any materials such as metal, for example steel or alloys, ceramics and polymers.

The device may also include features such as a collection mechanism for the rod-shaped stabilized particles and a dust reduction mechanism. For example, as shown in FIG. 6, as the rod-shaped particles of desired size exit the cutting chamber, the rods may exit the device onto a transporting belt 59 or may exit directly into a collection vessel (not shown). Further, at or near the point of exit from the cutting chamber, a conduit 55 may be located to connect the cutting chamber with a dust collection chamber 56. Conduit 57 may be associated with the dust collection chamber to provide a connection with, for example, a vacuum pump 58. A filter 61 may be mounted at the entrance end of the conduit to the dust collection chamber. The power of the vacuum pump may be controlled so only dust is collected in the dust collection chamber, while permitting the rod-shaped particles to exit the cutting chamber to the point of collection without being collected by the dust collection chamber.

The end size of the rod-shaped particles may be controlled through control of the number, size and shape of the cutting bars, and the rotational speed of the cutting bars, and the length of the cutting chamber.

Upon collection, the rod-shaped particles may be subjected to sieving to ensure that the rod-shaped particles have the desired size. Larger sized rod-shaped particles unable to pass through the sieve may be collected and re-introduced back through the rotating cutting device until rod-shaped particles of the desired size are obtained.

Advantages that may be realized with the use of the rotating cutting mechanism include, for example, that the device can be added to the production line of rod-shaped particles for continual particle manufacture. Further, by selecting the shape, the number, and the rotating speed of the cutting bars, pre-sintered stabilized rods of any length and diameter may be reduced to a desired length for using as proppant and anti-flowback additives after sintering.

After the rod-shaped particles of a desired size are obtained, the rod-shaped particles are then desirably subjected to a strength increasing treatment. For example, the rod-shaped particles may be subjected to sintering. Sintering may be conducted at a temperature of from, for example, about 800° C. to about 2,300° C., such as from about 1,200° C. to about 1,700° C.

The end size-reduced rod-shaped particles may have an average length of 0.2 mm to 5 cm, an average diameter (or cross-sectional width) of 0.1 mm to 1 cm, and an average length to diameter of at least 2:1. The rod-shaped particles desirably have an average length of 0.2 mm to 5 cm, for example from 0.2 mm to 1 cm or from 0.2 mm to 50 mm. The rod-shaped particles desirably have an average diameter (or cross-sectional width) of 0.1 mm to 1 cm, for example from 0.1 mm to 5 mm or 0.1 mm to 1 mm. The rod-shaped particles have an average length to diameter (or width) of at least 2:1, for example of 5:1 to 1,000:1 or 5:1 to 100:1.

The rod-shaped particles made by the methods herein possess a number of desirable properties compared to conventional spherical proppants and anti-flowback additives.

Where the rod-shaped particles are used as proppant in a treatment fluid, compared to conventional spherically shaped proppant, the rod-shaped particles disclosed herein may interlock with fiber included in the treatment fluid, as well as interlock with themselves, achieving a lower settling rate, and thus can be more easily transported into fractures. Fracturing methodologies that use fibers in the fracturing fluid typically rely on proppant clusters/pillars to maintain the width of a fracture and channels for conducting the formation fluid. Pillars with low strength may spread and collapse under closure stress, which reduces the channel size and/or eliminates the channels. The interlocking of the rod-shaped particles herein with the fibers and with themselves may increase the strength of the pillars, compared to the use of spherical proppant with a similar surface texture.

Besides the strength of the proppant, a tight packing may inhibit the flow of the formation fluid to the wellbore. The way of packing can depend on the shape of the proppant. The rod-shaped particles disclosed herein may interlock with each other, thereby reducing their mobility, which in turn may help to maintain an adequate level of porosity and conductivity for formation fluids such as oil and/or gas to flow.

The rod-shaped particles described herein may thus be harder to flow back compared to spherically shaped proppant. The particles can be used together with other shaped proppants as an anti-flowback additive. The particles can also be used together with fiber to achieve enhanced anti-flowback control.

Packs of the rod-shaped particles in a fracture can have high conductivity due to high porosity resulting from mechanisms of the particles' interlocking.

The mechanical interactions of rod-shaped particles with themselves and/or with fiber may increase the capability of the fiber to transport proppant into the fracture during a fracturing treatment and also may increase the strength of pillars when the fracture walls close onto the pillars.

In some embodiments, the concentration of the rod-shaped particles in the treatment fluid may be any desired value, such as a concentration in the range of from about 0.01 to about 80% by weight of the treatment fluid, or a concentration in the range of from about 0.1 to about 25% by weight of the treatment fluid, or a concentration in the range of from about 1 to about 10% by weight of the treatment fluid.

Although the rod-shaped particles may be used by themselves in the fluid, for example as proppants for a fracture, they may also be used together with conventional proppants, for example with spherical proppant particles of glass, sand, ceramic and the like. Other proppant particles may be used in a weight ratio of the rod-shaped particles to the other proppant particles of from 0.1:1 to 10:1. In some embodiments, other proppants may include sand, synthetic inorganic proppants, coated proppants, uncoated proppants, resin coated proppants, and resin coated sand. The proppants may be natural or synthetic (including silicon dioxide, sand, nut hulls, walnut shells, bauxites, sintered bauxites, glass, natural materials, plastic beads, particulate metals, drill cuttings, ceramic materials, and any combination thereof), coated, or contain chemicals; more than one may be used sequentially or in mixtures of different sizes or different materials. The proppant may be resin coated. The rod-shaped particles may also be resin coated, where desired.

In some embodiments, the treatment fluids may also include a fibrous material, as well known in the art. Fibers may be included in the treatment fluid in order to assist in transport of the rod-shaped particles into the fractures. For example, the treatment fluid may comprise rod-shaped particles and a fiber of any desired thickness (diameter), density and concentration that is effective to assist in the downhole operation. The fiber may be one or more member selected from natural fibers, synthetic organic fibers, glass fibers, ceramic fibers, carbon fibers, inorganic fibers, metal fibers, or a coated form of any of the above fibers.

Fibers may be used in bundles. The fibers may have a length in the range of from about 1 mm to about 30 mm, such as in the range of from about 5 mm to about 20 mm. The fibers may have any suitable diameter or cross dimension (shortest dimension), such as a diameter of from about 5 to 500 microns, or a diameter of from about 20 to 100 microns, and/or a denier of from about 0.1 to about 20, or a denier of from about 0.15 to about 6.

The fibers may be formed from a degradable material or a non-degradable material. The fibers may be organic or inorganic. Non-degradable materials are those wherein the fiber remains substantially in its solid form within the well fluids. Examples of such materials include glass, ceramics, basalt, carbon and carbon-based compound, metals and metal alloys. Polymers and plastics that are non-degradable may also be used as non-degradable fibers. Such polymers and plastics that are non-degradable may include high density plastic materials that are acid and oil-resistant and exhibit a crystallinity of greater than 10%. Degradable fibers may include those materials that can be softened, dissolved, reacted or otherwise made to degrade within the well fluids. Such materials may be soluble in aqueous fluids or in hydrocarbon fluids.

Suitable fibers may also include any fibrous material, such as, for example, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof.

The treatment fluid includes a carrier solvent that may be a pure solvent or a mixture. Suitable solvents may be aqueous or organic based. For example, the treatment fluid may include a carrier solvent and the rod-shaped particles. The fluid may be any suitable fluid, such as, for example, water, fresh water, produced water, seawater, or an aqueous solvent, such as brine, mixtures of water and water-soluble organic compounds and mixtures thereof. Other suitable examples of fluids include hydratable gels, such as guars, poly-saccharides, xanthan, hydroxy-ethyl-cellulose; cross-linked hydratable gels, viscosified acid, an emulsified acid (such as with an oil outer phase), an energized fluid (including, for example, an $N_2$ or $CO_2$ based foam), and an oil-based fluid including a gelled, foamed, or otherwise viscosified oil. Suitable organic solvents that may act as a carrier solvent for the treatment fluids of the disclosure include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxyethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N, N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

Treatment fluids may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers. Furthermore, the treatment fluid may comprise buffers, pH control agents, and various other additives added to promote the stability or the functionality of the treatment fluid. The components of the treatment fluid may be selected such that they may or may not react with the subterranean formation that is to be treated.

In some embodiments, the treatment fluid may further have a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers that may be used as a viscosifying agent include polyvinyl polymers, polymethacrylamides, cellulose ethers, lignosulfonates, and ammonium, alkali metal, and alkaline earth salts thereof. Additional examples of other water soluble polymers that may be used as a viscosifying agent include acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In some embodiments, the carrier fluid may optionally further comprise additional additives, including, for example, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The foregoing is further illustrated by reference to the following examples, which are presented for purposes of illustration and are not intended to limit the scope of the present disclosure.

EXAMPLES

To prepare rod-shaped particles, the apparatus of FIG. 1 was used, with the device including a single orifice immersed in the coagulation solution. A sample slurry of 144 g water, 400 g ceramic raw powder (alumina-based), 1.6 g of sodium alginate, 0.8 g of dispersant (synthetic polyelectrolyte dispersing agent), 0.38 g of phosphate based surfactant and 0.48 g of lubricant (alkali-free pressing agent) was prepared and used for illustration.

The coagulation solution was comprised of a 2 w % of calcium chloride solution. The orifice had an orifice diameter of 0.8 mm, and the slurry was fed through the orifice at a rate of 9 ml/min. The stabilized rods were taken out from the coagulation solution and dried in an oven at 60° C. for 10 hours. 100 g of the dried rods, with an average diameter of 0.8 mm, were placed in a plastic cylindrical vessel with an inside height of 8 cm and diameter of 6 cm. The vessel was held by one hand and placed on a VWR analog Vortex Mixer for shaking. With a shaking frequency of 60 Hz and amplitude of 2 mm, the length of 300 to 700 rod-shaped particles were measured after shaking for 0.25, 1, 3, and 5 minutes. The length of the rod-shaped particles as a function of the shaking time is shown in FIG. 7. The average length and the range of the length distribution decreased with shaking time until reaching a plateau state, showing the effectiveness of reducing length of the particles through shaking.

Although the preceding description has been set forth with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for forming rod-shaped particles, comprising:
   (i) inducing flow of a slurry comprised of particles and a reactant through one or more orifices, forming a continuous uninterrupted stream;
   (ii) allowing the continuous uninterrupted stream to become submerged in a coagulation solution, wherein the continuous uninterrupted stream forms a continuous rod;
   (iii) at least partially coagulating the reactant of the continuous rod in the coagulation solution, wherein the continuous rod is pre-sintered; and
   (iv) applying mechanical vibration or using a rotating cutting mechanism to break the pre-sintered continuous rod into rods of reduced length.

2. The method according to claim 1, wherein the mechanical vibration for reducing the length of the pre-sintered continuous rods is applied by a device comprising a vessel, wherein the pre-sintered continuous rods are loaded into the vessel and vibrational energy is applied to the loaded vessel.

3. The method according to claim 2, wherein the vessel includes a plurality of protuberances along one or more interior walls of the vessel.

4. The method according to claim 2, wherein the vessel includes one or more bars extending from at least one interior wall of the vessel and extending partially or fully across an interior of the vessel.

5. The method according to claim 2, wherein the vessel includes one or more sieves through which the reduced length pre-sintered continuous rods can pass when the pre-sintered continuous rods have a desired reduced length.

6. The method according to claim 1, wherein the pre-sintered continuous rods are dropped vertically through the device having the rotating cutting mechanism and encounter the rotating cutting mechanism as the pre-sintered continuous rods fall through the device.

7. The method according to claim 1, wherein the rotating cutting mechanism comprises one or more bars extending from a rotating spine.

8. The method according to claim 1, wherein the particles are ceramic particles.

9. The method according to claim 1, wherein the reactant is an alginate and the coagulation solution comprises a calcium salt.

10. The method according to claim 1, wherein the reduced length rod-shaped particles have an average length of 0.1 mm to 5 cm, an average diameter of 0.2 mm to 1 cm and an average length to diameter of at least 2:1.

11. The method according to claim 1, wherein the one or more orifices have a geometrical shape and impart a corresponding geometrical cross-section to the rod-shaped particles.

12. The method according to claim 1, wherein the method further comprises applying an intermittent vibration to the one or more orifices to thereby vary a cross-sectional diameter of the continuous uninterrupted stream exiting the one or more orifices.

* * * * *